United States Patent
Kaluzhny et al.

(10) Patent No.: US 10,445,001 B2
(45) Date of Patent: Oct. 15, 2019

(54) MEMORY CONTROL SCHEME FOR FLASH MEMORY DEVICES

(71) Applicant: WINBOND ELECTRONICS CORPORATION, Taichung (TW)

(72) Inventors: Uri Kaluzhny, Beit Shemesh (IL); Hezi Pereg, Tel Aviv-Jaffa (IL)

(73) Assignee: WINBOND ELECTRONICS CORPORATION, Taichung (TW)

( * ) Notice: Subject to any disclaimer, the term of this patent is extended or adjusted under 35 U.S.C. 154(b) by 157 days.

(21) Appl. No.: 15/437,471

(22) Filed: Feb. 21, 2017

(65) Prior Publication Data

US 2018/0196598 A1    Jul. 12, 2018

Related U.S. Application Data

(60) Provisional application No. 62/444,395, filed on Jan. 10, 2017.

(51) Int. Cl.
G06F 3/06 (2006.01)

(52) U.S. Cl.
CPC ............ *G06F 3/061* (2013.01); *G06F 3/0655* (2013.01); *G06F 3/0658* (2013.01); *G06F 3/0679* (2013.01)

(58) Field of Classification Search
USPC .................................................. 711/E12.001
See application file for complete search history.

(56) References Cited

U.S. PATENT DOCUMENTS

| | | | | |
|---|---|---|---|---|
| 6,721,764 | B2* | 4/2004 | Hitz ..................... | G06F 11/1435 |
| 8,805,788 | B2* | 8/2014 | Gross, IV ............. | G06F 16/188 |
| | | | | 707/649 |
| 2006/0282644 | A1* | 12/2006 | Wong .................. | G06F 12/0246 |
| | | | | 711/206 |
| 2013/0227207 | A1* | 8/2013 | Katz .................... | G06F 12/0246 |
| | | | | 711/103 |
| 2016/0070652 | A1* | 3/2016 | Sundararaman ...... | G06F 3/0619 |
| | | | | 711/154 |
| 2017/0242584 | A1* | 8/2017 | Zhang ..................... | G06F 3/061 |
| 2017/0315875 | A1* | 11/2017 | Tirupati Nagaraj ......... | |
| | | | | G06F 11/1453 |
| 2018/0165218 | A1* | 6/2018 | Parker ................. | G06F 12/1416 |

* cited by examiner

*Primary Examiner* — Charles Rones
*Assistant Examiner* — Jonah C Krieger
(74) *Attorney, Agent, or Firm* — Soroker Agmon Nordman (57) ABSTRACT

A method of controlling access to a flash memory device having multiple sectors divided into multiple blocks of memory, including accepting a virtual block address, calculating a set of possible sectors that can be used for storing data having the virtual block address based on a predefined function, reading meta-data of each sector from the set of possible sectors, wherein the meta-data of a sector includes information for each block in the sector indicating if the block is currently in use and the virtual block address of the data stored in the block, determining the physical block address of the virtual block address if the data is currently stored in a block in the possible sectors or if a block is currently allocated to store the data, wherein the set of possible sectors is distinct for each virtual block address.

20 Claims, 5 Drawing Sheets

MEMORY CONTROL SCHEME FOR FLASH MEMORY DEVICES

RELATED APPLICATIONS

This application claims priority from provisional application No. 62/444,395 filed on Jan. 10, 2017 the disclosure of which is incorporated herein by reference.

TECHNICAL FIELD

The present disclosure relates generally to controlling memory usage in a flash memory to increase access speed.

BACKGROUND

Flash memory devices are electronic non-volatile computer storage media that allow accessing or reading stored data, writing new data and erasing stored data. In recent years, due to the overwhelming advantage of large memory size and high rewriting speed, flash memory has played a major role in the non-volatile memory market. Flash memories are used in a variety of applications, for example in USB drives for personal information storage, or embedded in credit cards or gift cards to enable financial payments or transactions. Generally flash memory devices are used especially for application in which the data is rarely changed but read many times, since they can be read faster than they can be written.

Typically two types of technology are used to manufacture flash memory: NAND and NOR. NAND flash memory is generally characterized by having long rows of bits and they are written a row at a time. To change even a single bit the entire row must be read to a buffer, amended and then written back. In contrast the NOR flash memory technology allows writing the value '0' (zero) to any physical bit address in the storage device, and setting the values to '1' (one) when erasing a sector which includes a plurality of bits (e.g. a row). Generally a flash memory is initialized with the value of '1' (one) in all the bits, so that an application can easily write initial data by changing '1' bits to zeros. Changing zero bits back to ones is a slower and more complex process typically requiring backing up the current information of the entire sector to a work memory, correcting the desired bits, erasing the sector in the flash memory by initializing it to ones and changing selected bits to zero based on the modified content of the work memory. Thus erasing or updating data (i.e. changing zero bits back to one) in a flash memory is a relatively expensive operation and affects relatively large memory areas (Sectors). There is no way to erase smaller entities, like separate bits, bytes or words.

A possible solution to make it easier to "rewrite" data in the flash memory is to substitute another physical location for the same logical address. Thus, to rewrite a value at a given logical address, the following process is performed:
1. Find the physical location currently associated with the required address
2. Find and associate the next physical available location for the given address.
3. Write the updated value to the new location.

Typically a flash memory may include multiple sectors that are divided into multiple blocks of a preselected size. Any address can be presented as a sector number and a block offset in the sector. A memory management unit associates between physical and virtual blocks, and each virtual address is translated to a physical address by:

(physical address)=(the address of the associated physical sector)+(block offset in the sector).

For each physical block, the flash memory stores a number of flags denoting whether the block is empty (e.g. unused), associated (e.g. is being used) or expired (e.g. was used and the data was cancelled or transferred to a new block). If the block is associated, then the number of the virtual associated block is also stored in the flash memory.

When the content of the memory at a certain location is updated, the following is performed:
1. The updated content of the entire physical block associated with the virtual block at the location is copied to another physical block
2. The block association mapping is updated accordingly, namely, the previous physical block is marked as unassociated or expired and the new block is marked as associated to the associated virtual block.

Accordingly, to find the physical block currently associated with a given virtual block, the flash memory manager unit has to scan the entire memory array looking for the physical block currently marked as associated with the address of the current virtual block. In practice, this is a time consuming procedure that may be performed once upon initialization of the flash memory device for all virtual block addresses. The mapping information is then stored in a RAM in a form of a large look-up table, comprising an entry for each virtual block. When using a large flash memory the look up table can be large and consume a sizable amount of RAM.

SUMMARY

An aspect of an embodiment of the disclosure relates to a system and method of managing data storage in a flash memory device. The memory device includes a memory management unit and an array of sectors, wherein each sector includes multiple blocks. Each sector also includes meta-data for each block providing a virtual address for the block of data and flags that indicate if the block is empty or has content and if the content is currently associated with the virtual address recorded there or not associated any more. The memory management unit is configured to receive a virtual address and translate it to a sector index and block offset within the sector. The memory management unit uses a function that is activated on the virtual address to calculate a set of sector indexes in which the block is allowed to be located. The memory management unit then reads the meta-data of those sectors to locate the physical address of the block. When updating the content of an associated block the data is written to a new block within the set of sectors calculated for the virtual address and the meta-data is updated.

The set of sector indexes is unique for each virtual address, so that two virtual addresses always have at least one sector different. Optionally, the function may be even more limited that two virtual addresses will always result in sets of sectors that do not have more than one sector in common. In an exemplary embodiment of the disclosure, the number of sector indexes in the set is 2, 4 or 8 so that it may be represented by one, two or three bits.

There is thus provided according to an exemplary embodiment of the disclosure, a method of controlling access to a flash memory device having multiple sectors divided into multiple blocks of memory, comprising:

Accepting a virtual block address;

Calculating a set of possible sectors that can be used for storing data having the virtual block address based on a predefined function;

Reading meta-data of each sector from the set of possible sectors, wherein the meta-data of a sector includes information for each block in the sector indicating if the block is currently in use and the virtual block address of the data stored in the block;

Determining the physical block address of the virtual block address if the data is currently stored in a block in the possible sectors or if a block is currently allocated to store the data;

Wherein the set of possible sectors is distinct for each virtual block address.

In an exemplary embodiment of the disclosure, the predefined function is selected so that the number of shared sectors for any two virtual block addresses is not greater than 1. Optionally, the predefined function is selected so that virtual block address can be reconstructed from an index of the sector in which the physical block is stored and part of the bits of the virtual block address. In an exemplary embodiment of the disclosure, the part of the bits of the virtual address are the least significant bits. Optionally, the number of possible sectors in the set is four. In an exemplary embodiment of the disclosure, one of the multiple blocks in the sector is used to store the meta-data of the sector. Alternatively or additionally, the meta-data information for each block is stored in the block. In an exemplary embodiment of the disclosure, when a block is allocated to store data based on a virtual block address, the set of possible sectors is scanned to determine a number of unallocated blocks in the sectors and if the number of unallocated blocks is smaller than a pre-selected number then one of the possible sectors is chosen for garbage collection. Optionally, during garbage collection for a sector the virtual block address of each associated block in the sector is examined to determine a set of possible sectors for the virtual block address and the data of the associated blocks are copied to a different sector from the set of possible sectors for the virtual block address of the block. In an exemplary embodiment of the disclosure, after copying all the associated blocks in the sector to different sectors, the sector is reinitialized.

There is further provided according to an exemplary embodiment of the disclosure, a flash memory device, comprising:

A memory management unit;

An array of sectors, wherein each sector is divided into multiple blocks of memory;

Wherein the memory management unit is configured to:

Accept a virtual block address;

Calculate a set of possible sectors that can be used for storing data having the virtual block address based on a predefined function;

Read meta-data of each sector from the set of possible sectors, wherein the meta-data of a sector includes information for each block in the sector indicating if the block is currently in use and the virtual block address of the data stored in the block;

Determine the physical block address of the virtual block address if the data is currently stored in a block in the possible sectors or if a block is currently allocated to store the data;

Wherein the set of possible sectors is distinct for each virtual block address.

In an exemplary embodiment of the disclosure, the predefined function is selected so that the number of shared sectors for any two virtual block addresses is not greater than 1. Optionally, the predefined function is selected so that virtual block address can be reconstructed from an index of the sector in which the physical block is stored and part of the bits of the virtual block address. In an exemplary embodiment of the disclosure, the part of the bits of the virtual address are the least significant bits. Optionally, the number of possible sectors in the set is four. In an exemplary embodiment of the disclosure, one of the multiple blocks in the sector is used to store the meta-data of the sector. Alternatively or additionally, the meta-data information for each block is stored in the block. In an exemplary embodiment of the disclosure, when a block is allocated to store data based on a virtual block address, the set of possible sectors is scanned to determine a number of unallocated blocks in the sectors and if the number of unallocated blocks is smaller than a pre-selected number then one of the possible sectors is chosen for garbage collection. Optionally, during garbage collection for a sector the virtual block address of each associated block in the sector is examined to determine a set of possible sectors for the virtual block address and the data of the associated blocks are copied to a different sector from the set of possible sectors for the virtual block address of the block. In an exemplary embodiment of the disclosure, after copying all the associated blocks in the sector to different sectors, the sector is reinitialized.

In an exemplary embodiment of the disclosure, the above method for controlling a flash memory device is implemented by a programming code stored on a non transitory storage medium.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1A:
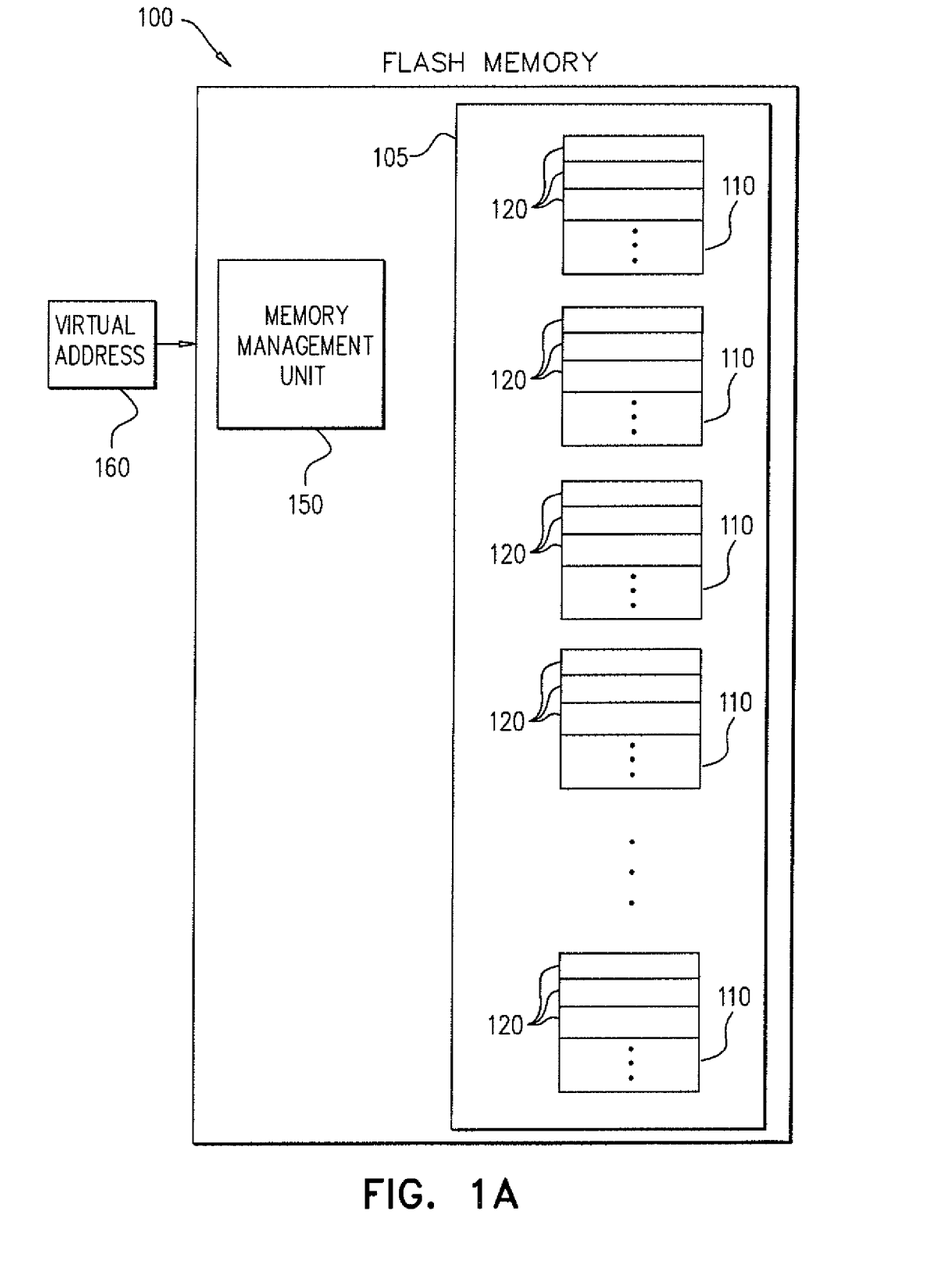
FIG. 1A is a schematic illustration of a flash memory, according to an exemplary embodiment of the disclosure.

FIG. 1A is a schematic illustration of a flash memory 100, according to an exemplary embodiment of the disclosure. In an exemplary embodiment of the disclosure, flash memory 100 includes a memory management unit 150 and a memory array 105 comprising multiple memory sectors 110 that serve as the basic unit that needs to be initialized when wanting to change zero bits back to one bits in the content of the sector. Optionally, each sector 110 is divided into memory storage blocks 120. Each physical block 120 can hold the data of a selected virtual address 160 as designated by memory management unit 150. Optionally, when providing a virtual address 160 to flash memory 100, memory management unit 150 accepts the virtual address 160 and determines the physical sector number and block number within the sector where the data is currently stored (e.g. to perform a read operation) or should be stored (e.g. in a new unused block during a write operation). In an exemplary embodiment of the disclosure, memory management unit 150 may include a processor and memory to perform calculations.

In an exemplary embodiment of the disclosure, the sectors 110 used for storing a block of data having a specific virtual address 160 are limited to a preselected number of sectors (e.g. 4-8 sectors) with addresses that are calculable by a function. Accordingly, access to a specific block 120 based on the virtual address 160 is limited to checking only the calculated sectors and does not require maintaining a look-up table (LUT) in RAM or searching through all sectors 110 of the entire flash memory 100. This speeds up access to the flash memory 100 and does not require use of a large amount of memory.

Figure 1B:
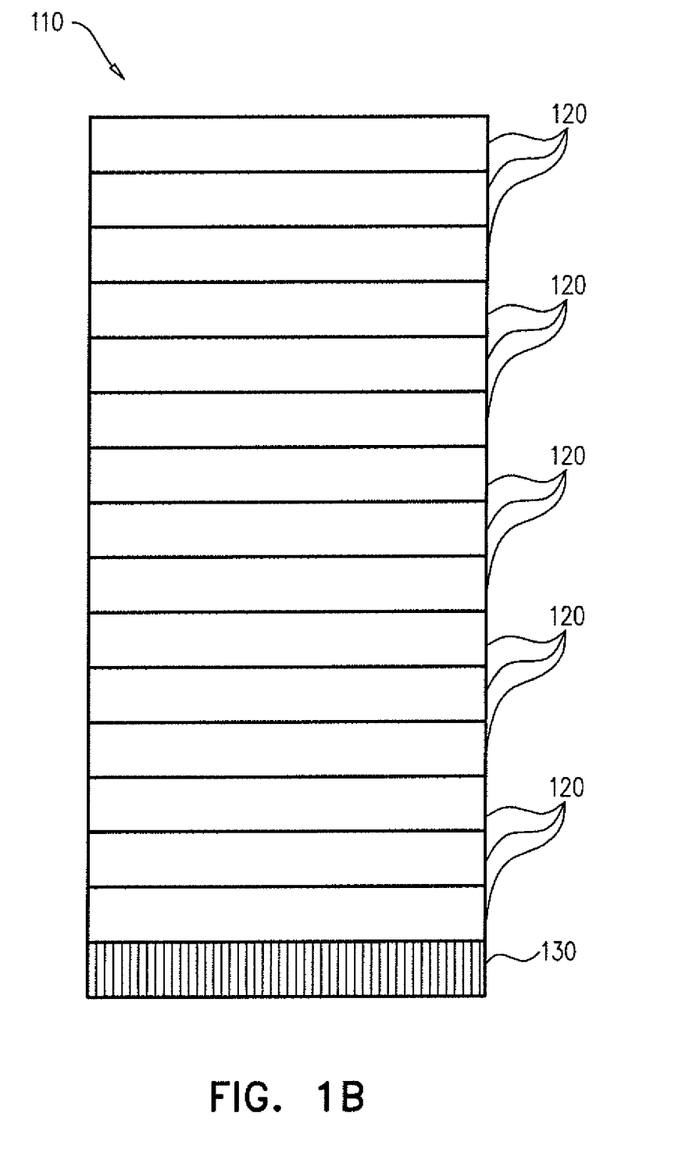
FIG. 1B is a schematic illustration of the structure of a sector in a flash memory, according to an exemplary embodiment of the disclosure.

FIG. 1B is a schematic illustration of the structure of sector 110 in flash memory 100, according to an exemplary embodiment of the disclosure. Each sector 100 includes multiple blocks 120 and meta-data for each block 120. In some embodiments of the disclosure, the meta-data is stored within each block 120, for example in a set of preserved bits at the beginning or end of the block. Alternatively, each sector 110 includes a meta-data block 130 for all the blocks of the sector 110 (e.g. the first or last block of sector 110 includes the meta-data for the entire sector 110).

Figure 1C:
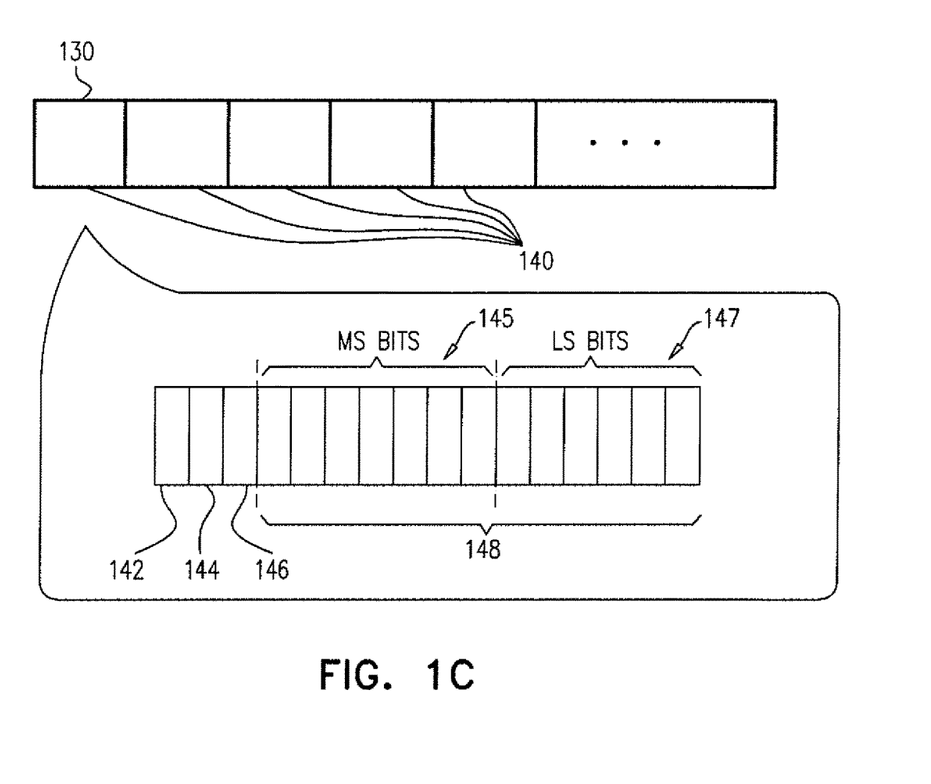
FIG. 1C is a schematic illustration of meta-data content of a sector in a flash memory, according to an exemplary embodiment of the disclosure.

FIG. 1C is a schematic illustration of meta-data content of a sector 110 in a flash memory 100, according to an exemplary embodiment of the disclosure. Optionally, when writing data to a block 120 a corresponding meta-data record 140 is written in the meta-data block 130. In an exemplary embodiment of the disclosure, the meta-data record 140 includes the following information: the virtual address 160 of the block 120, and about two or three bits that indicate the status of the block 120 from the last initialization/re-initialization of the sector 110, for example:

1. A bit 142 designating if the corresponding block is empty (e.g. "1" designates that the corresponding block 120 was never used and "0" designates that the block was previously used).

2. A bit 144 designating, if the content in the corresponding block 120 is currently associated with a virtual address 160 or if it was canceled, for example the current block is not current and a new block contains the data of the virtual address 160 (e.g. "1"=associated, "0"=not associated i.e. has expired).

3. A bit 146 for other optional indications.

In an exemplary embodiment of the disclosure, the rest of the meta-data record 140 contains address bits 148 that provide the virtual address 160 of the block that is stored in the corresponding block 120 in the sector 110. Optionally, the address can be viewed as made up of a most significant part 145 and a least significant part 147. In some embodiments of the disclosure, as explained below, it is sufficient to only extract the least significant bits 147 while taking into account the function used, to identify the virtual address 160 of the data in the corresponding block 120.

In an exemplary embodiment of the disclosure, the function restricting the habitat of a block of data in the flash memory (e.g. designated as Hab (v) where v is the virtual address 160) is defined to provide a set of sector addresses in which the block of data can be stored (e.g. physical addresses $SI_1$, $SI_2$, $SI_3$, $SI_4$ for sectors having index numbers $I_1$, $I_2$, $I_3$, $I_4$). Optionally, the function is defined to be mutually exclusive so that two virtual addresses 160 will not store data blocks in exactly the same set of sectors, but rather there will always be at least one sector not in common (i.e. not shared).

In an exemplary embodiment of the disclosure, the function is even more restricted that the set of sectors for two virtual addresses 160 (e.g. v1≠v2) will not have more than one sector in common. In an exemplary case for demonstration purposes we will review a flash memory 100 having 512 sectors 110, wherein each sector 110 contains 16 blocks 120. 15 of the blocks 120 are used for data and one block 130 is used for the meta-data of the blocks of the sector. Optionally, each block includes at least 256 bits (to have enough room for the required meta-data), thus the flash memory's size in this exemplary case is at least 256 kilobyte or larger (512*16*256/8). In this case the virtual block address 160 is 13 bits long and a sector index (e.g. $I_1$, $I_2$, $I_3$, $I_4$) is 9 bits long (for 512 sectors). The 13 bit address is divided into 7 most significant (MS) bits $a_7$ and 6 least significant (LS) bits $a_6$.

$$a_7(v)=\lfloor v/64 \rfloor, a_6(v)=v\%64;$$

a function $f(v)$—is defined as:

$f(v)$—a 7-bit function, such that if $a_6(v_1)=a_6(v_2)$ and $f(v_1)=f(v_2)$, then $v_1=v_2$.

We use $f(v)=a_7(v) \oplus 2a_6(v)$.

Additionally we define $t_j(v)=j*2^7+(f(v)+j*a_6(v)) \%2^7$ to be the 9 bit sector indexes used (e.g. 4 possible sectors; j=1 to 4).

Figure 2:
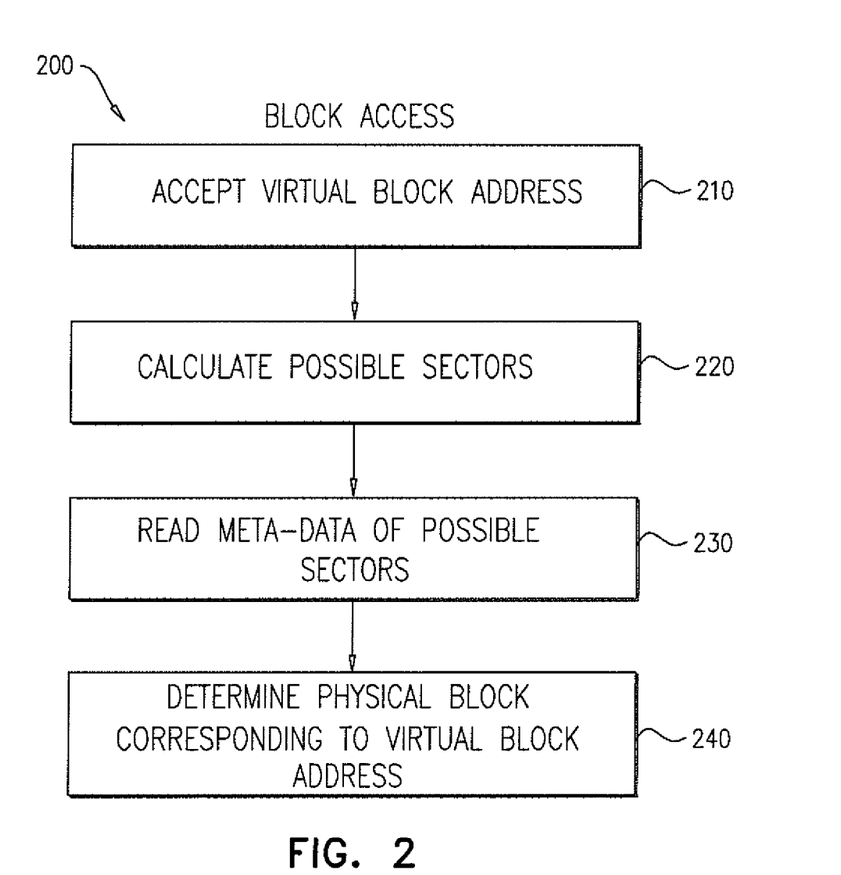
FIG. 2 is a flow diagram of a method of accessing a physical block based on a virtual address, according to an exemplary embodiment of the disclosure.

FIG. 2 is a flow diagram of a method 200 of accessing a physical block based on a virtual address 160, according to an exemplary embodiment of the disclosure. In an exemplary embodiment of the disclosure, when requesting to read a block at virtual address 160 or write a block to virtual address 160, memory management unit 150 accepts (210) the virtual block address 160 and calculates (220) the possible sectors (having indexes $I_1$, $I_2$, $I_3$, $I_4$) at which the block 120 may be physically stored. Optionally, memory management unit 150 reads (230) the meta-data blocks of the possible sectors to determine (240) a physical block address ($SI_j$+block offset in the sector $I_j$) corresponding to the virtual block address 160. For a read operation the virtual address 160 will appear in the address bits 148 of one of the meta-data records 140 in the meta-data blocks 130 of the possible sectors 110. When writing to an existing block that requires rewriting the block (e.g. to change zero bits back to one bits) the associated bit 144 of the meta-data record 140 will be marked as zero (not associated) and a new unused block 120 from the possible sectors 110 will be used to store the updated block of data. The meta-data record 140 of the old block and the new block will both be updated to reflect the change. In an exemplary embodiment of the disclosure, if all the blocks 120 of a sector 110 are marked as not associated then the entire sector can be re-initialized for further use since none of the blocks 120 contain active data.

In an exemplary embodiment of the disclosure, the function (Hab (v)) is designed to enable reconstructing the virtual address 160 from an index of the sector provided by Hab (v) (e.g. $I_1$, $I_2$, $I_3$, $I_4$) and a part of the bits of v (e.g. the LS bits stored in bits 147). Thus only a part of the virtual address 160 needs to be stored in meta-data record 140 and/or be retrieved when checking addresses. According to the exemplary embodiment described above, v can be reconstructed from $I_j$ and $a_6$ according to the following calculation:

$$j=\lfloor i_j/2^7 \rfloor, d=a_7 \oplus 2a_6=(i_j-j*a_6)\%2^7, a_7=d\oplus 2a_6.$$

$$v=a_7*64+a_6$$

Optionally, address 148 in meta-data record 140 can be stored using only the LS bits 147 so the meta-data block 130 can be smaller than 256 bits (e.g. only using 8 bits per block instead of 16, thus using about 120 bits for 15 blocks).

In an exemplary embodiment of the disclosure, handling the flash memory requires performing garbage collection every once in a while to remove blocks 120 that are not used anymore. Optionally, memory management unit 150 may periodically examine the sectors of the flash memory to locate sectors that are low on free blocks (e.g. having less than a preselected threshold number of free blocks, e.g. less than four, three or two free blocks in the sector) to perform garbage collection.

Figure 3:
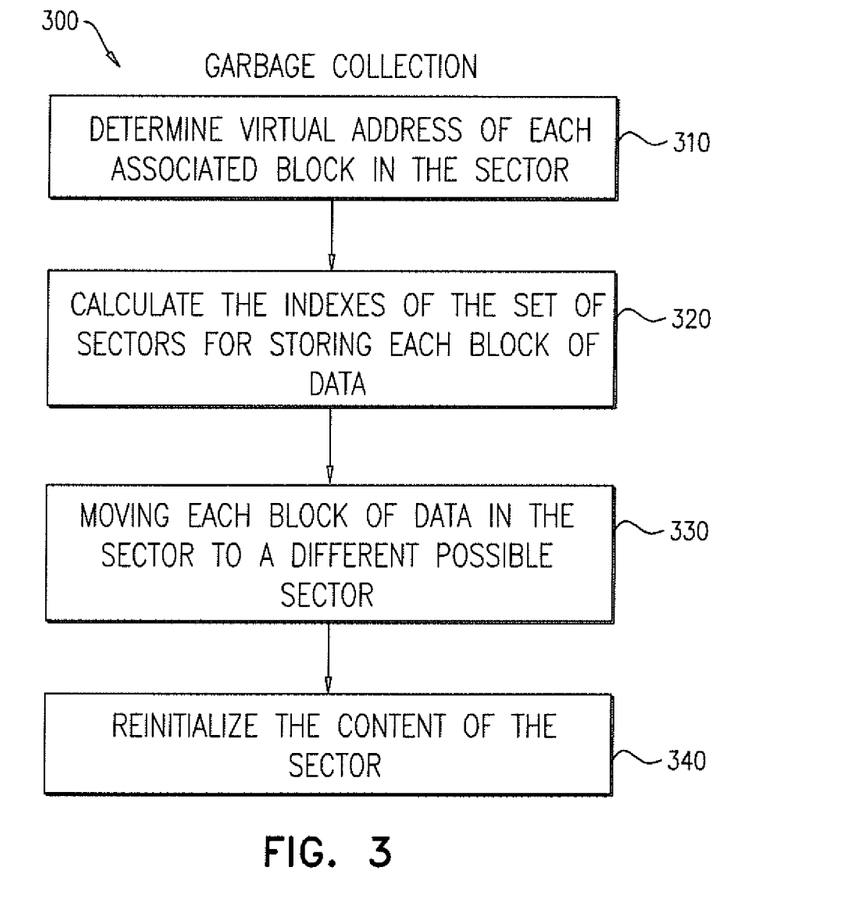
FIG. 3 is a flow diagram of a method of garbage collection in a flash memory, according to an exemplary embodiment of the disclosure.

FIG. 3 is a flow diagram of a method of garbage collection 300 in a flash memory 100, according to an exemplary embodiment of the disclosure. Optionally, the garbage collection process for a sector includes:

1. Determining (310) the virtual address 160 of each associated block in the sector;
2. Calculating (320) the indexes of the set of possible sectors in which each associated block of data can be stored based on the virtual address 160;
3. Moving (330) each block of data from the sector to a different possible sector (e.g. with the least amount of used blocks) from the set of sectors for the virtual address 160 to empty out the current sector;
4. Reinitializing (340) the sector (e.g. resetting its content to one).

In some embodiments of the disclosure, garbage collection process 300 is performed on a sector 110 if a free block 120 is requested and the sector has no free blocks 120.

In some embodiments of the disclosure, when a new block of data is written to a sector 110 based on its virtual address 160 then all possible sectors from the set of sectors associated with the virtual address 160 are scanned to determine an overall number of free blocks left for the virtual address. If the number of free blocks is less than a preselected number then one or more of the sectors are marked for garbage collection. Optionally, when memory management unit 150 is idle it can perform garbage collection for the possible sector 110 or sectors 110 as described above.

It should be noted that the number of sectors, blocks, bits, and number of sectors in a set quoted above are only exemplary and other possible values may be used instead.

Below in appendix A there is provided an exemplary mathematical representation for defining the function Hab. In Appendix B there is provided an exemplary pseudo code listing (using Python notation) for implementing the storage scheme described in the current disclosure. Optionally, the code can be stored on a non-transitory storage medium, for example a ROM, flash memory, CD, DVD or other device. In an exemplary embodiment of the disclosure, the code is provided to the memory management unit 150 to control access to the flash memory array 105.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure. It will also be appreciated by persons skilled in the art that the present disclosure is not limited to what has been particularly shown and described hereinabove.

APPENDIX A: SPARSE ALLOCATION FUNCTION

We denote, for a natural number A, $\tilde{A}=\{0,\ldots,A-1\}$
The goal is to construct a function H: $\overline{N}\times\overline{K}\rightarrow\overline{M}$ such that for $n_1\neq n_2$ $|\{H(n_1,i)|i\in\overline{K}\}\cap\{H(n_2,i)|i\in\overline{K}\}|\leq 1$.

1. For a positive number $\Delta$, we consider function of the type $H(n,i)=i*\Delta+(f(n)+i*g(n))\%\Delta$.
2. Also, we chose functions $f: \overline{N}\rightarrow\overline{\Delta}$ and $g: \overline{N}\rightarrow\overline{\Delta}$ so that $f(n_1)=f(n_2),g(n_1)=g(n_2)\Rightarrow n_1=n_2$.

Note that our choice implies that
$H(n_1,i)=H(n_2,j)$ is possible only if $i=j$.
$\Delta^2\geq N$, $K*\Delta\leq M$
Suppose that for $i>j$, we have $H(n_1, i)=H(n_2,i)$ and $H(n_1,j)=H(n_2,j)$.
Then $$f(n_1)+i*g(n_1) \triangleq f(n_2)+i*g(n_2)$$

$$f(n_1(+j*g(n_1) \triangleq f(n_2(+j*g(n_2))$$

where we write $A \triangleq B$ for $(A-B)\%\Delta=0$
This means that $$f(n_1)-f(n_2) \triangleq i*(g(n_2)-g(n_1)), f(n_1)-f(n_2) \triangleq j*g(n_2)-(n_1))$$

From this, $$0 \triangleq (i-j)*(g(n_2)-g(n_1))$$

In order not to have more than one collision, we have to ensure that the last equation ensures that either $n_1=n_2$ or $i=j$. Note that $g(n_1)-g(n_2) \triangleq 0$, implies $f(n_1)-f(n_2) \triangleq 0$, which means $n_1=n_2$.

1. We can chose A so that for any $k\in\{2,\ldots,K-1\}$, k does not divide $\Delta$. Then the last equation will imply that $i=j$
2. If we want $\Delta$ to be a power of 2, we can, for example, take K=4 and chose g so that $g(n)<\Delta/2$. Then only $i-j=2$ divides $\Delta$, but $2*(g(n_2)-g(n_1))<\Delta$ Let us illustrate the first way by an example:
Take N=8000, then $\Delta$=91 will do (91*91=8281). This allows taking K=7, M=91*7=637 because for any $k\in\{2,\ldots,6\}$, k does not divide 91=13*7.
We can take $f(n)=n\%91$, $g(n)=\lfloor n/91 \rfloor=91*i+(f(n)+*g(n))\%91$

| APPENDIX B: Pseudo-code (Python notation) |
| --- |

```
def logical_block_ind(lut_address_entry):
    i = Sector_Index >> 7
    s7 = 0x7f & Sector_Index
    a7 = (s7 - i * lut_address_entry) ^ (lut_address_entry << 1)
    return ((0x7f & a7) << 6) | lut_address_entry
# returns 4 sector indexes where the block can be written
def habitat(logical_block_ind):
    a6 = logical_block_ind & 0x3f
    a7 = (logical_block_ind >> 6) ^ (a6 << 1)
    for i in range (4):
        yield (i << 7) | (0x7f & (a7 + i * a6))
def Write_to_Flash(logical_block_ind, data):
    # find the previous instance, if exists
    for sector in habitat(logical_block_ind):
        # actually, only a part of the in the logical_block_ind is
        # stored in a LUT of a sector, but the algorithm ensures
        # that this part matches only if the whole index does
```

-continued

APPENDIX B: Pseudo-code (Python notation)

```
        block_index_in_sector = find(sector.lut(logical_block_ind))
        if blck_ind != None:
            old_instance = (sector, block_index_in_sector)
            break
    else:
        old_instance = None
    # find empty block and write the data
    for new_sector in sectors:
        if find_empty(new_sector) != None:
            write the data to the new_sector, mark the newly
            occupied physical block as "in-use" and fill
            the corresponding LUT entry of the new_sector
            with 6 LS bits of logical_block_ind
            break
    else:
        raise OverflowError
    # delete the previous instance
    if old_instance != None:
        prev_sector, block_index_in_sector = old_instance
        mark as "expired" prev_sector[block_index_in_sector]
    if not in garbage collection:
        sectors = habitat(logical_block_ind)
        n_empty = sum(empty_blocks(s) for s in sectors)
        if n_empty <= Flash.garbage_collection_threshold:
            chose a sector for the garbage collection in sectors
def Read_from_Flash(logical_block_ind):
    for sector in self.habitat(logical_block_ind):
        for block_index in range(nDATA_BLOCKS_IN_SECTOR):
            if (sector[block_index] is marked as "in-use" and
                sector[block index] is not marked as "expired"
                lut_address of sector[block_index] matches the
                and corresponding part of logical_block_ind):
                    return the data from sector[block_index]
def Garbage_Collection(chosen_sector):
    for each "in-use" "non-old" block in chosen_sector:
        logical_ind = logical_block_ind(lut_address_entry)
        move data to another sector in habitat(logical_ind)
    erase chosen_sector
```

We claim:

1. A method of controlling access to a flash memory device having multiple sectors divided into multiple blocks of memory, comprising:
accepting a virtual block address;
calculating, using a predefined function in a form of an equation, having the virtual block address, a set of sector indexes for a set of possible sectors that can be used for storing data, wherein the predefined function restricts data storage to blocks in the set of possible sectors and, for any two virtual block addresses, at least one sector is not commonly shared;
reading meta-data of each sector from the set of possible sectors, wherein the meta-data of a sector includes information for each block in the sector indicating if the block is currently in use and the virtual block address of the data stored in the block;
determining from the meta-data a physical block address of the virtual block address if the data is currently stored in a block of the set of possible sectors or the physical block address of a currently allocated block from the blocks of the set of possible sectors to store the data;
wherein the set of possible sectors is distinct for each virtual block address;
wherein the predefined function is selected so that a number of shared sectors for any two virtual block addresses is not greater than 1.

2. The method according to claim 1, wherein the predefined function is selected so that die virtual block address can be reconstructed from an index of the sector in which the physical block is stored and pail of the bits of the virtual block address.

3. The method according to claim 2, wherein the part of the bits of the virtual address are the least significant bits.

4. The method according to claim 1, wherein the number of possible sectors in the set is four.

5. The method according to claim 1, wherein one of the multiple blocks in the sector is used to store the meta-data of the sector.

6. The method according to claim 1, wherein the meta-data information for each block is stored in the block.

7. The method according to claim 1, wherein when a block is allocated to store data based on a virtual block address, the set of possible sectors is scanned to determine a number of unallocated blocks in the sectors and if the number of unallocated blocks is smaller than a pre-selected number then one of the possible sectors is chosen for garbage collection.

8. The method according to claim 7, wherein during garbage collection for a sector the virtual block address of each associated block in the sector is examined to determine a set of possible sectors for the virtual block address and the data of the associated blocks are copied to a different sector from the set of possible sectors for the virtual block address of the block.

9. The method according to claim 8, wherein after copying all the associated blocks in the sector to different sectors, the sector is reinitialized.

10. A flash memory device, comprising:
a memory management unit;
an array of sectors, wherein each sector is divided into multiple blocks of memory;
wherein the memory management unit is configured to:
accept a virtual block address;
calculate, using a predefined function in a form of an equation having the virtual block address, a set of sector indexes for a set of possible sectors that can be used for storing data, wherein the predefined function restricts data storage to blocks in the set of possible sectors and, for any two virtual block addresses, at least one sector is not commonly shared;
read meta-data of each sector from the set of possible sectors, wherein the meta-data of a sector includes information for each block in the sector indicating if the block is currently in use and the virtual block address of the data stored in the block;
determine from the meta-data a physical block address of the virtual block address if the data is currently stored in a block of the set of possible sectors or the physical address of a currently allocated block from the blocks of the set of possible sectors to store the data;
wherein the set of possible sectors is distinct for each virtual block address;
wherein the predefined function is selected so that a number of shared sectors for any two virtual block addresses is not greater than 1.

11. The device of claim 10, wherein the predefined function is selected so that the virtual block address can be reconstructed from an index of the sector in which the physical block is stored and part of the bits of the virtual block address.

12. The device of claim 11, wherein the part of the bits of the virtual address are the least significant bits.

13. The device of claim 10, wherein one of the multiple blocks in the sector is used to store the meta-data of the sector.

14. The device of claim 10, wherein the meta-data information for each block is stored in the block.

15. The device of claim 10, wherein when a block is allocated to store data based on a virtual block address, the set of possible sectors is scanned to determine a number of unallocated blocks in the sectors and if the number of unallocated blocks is smaller than a pre-selected number then one of the possible sectors is chosen for garbage collection.

16. The device of claim 15, wherein during garbage collection for a sector the virtual block address of each associated block in the sector is examined to determine a set of possible sectors for the virtual block address and the data of the associated blocks are copied to a different sector from the set of possible sectors for the virtual block address of the block.

17. The device of claim 16, wherein after copying all the associated blocks in the sector to different sectors, the sector is reinitialized.

18. A non-transitory storage medium comprising code for controlling a flash memory device according to the method of claim 1.

19. The method of claim 1, wherein reading the meta-data of each sector from the set of possible sectors comprises reading meta-data from one meta-data block with the information for all of the blocks in each sector.

20. The device of claim 10, wherein the memory management, unit is configured to read the meta-data of each sector from the set of possible sectors by reading meta-data from one meta-data block with the information for all of the blocks in each sector.

* * * * *